US006880794B1

(12) United States Patent
Kahn

(10) Patent No.: US 6,880,794 B1
(45) Date of Patent: Apr. 19, 2005

(54) UNIVERSAL TOOL HOLDER

(76) Inventor: Peter P. Kahn, 381 S. Country Rd., Brookhaven Hamlet, NY (US) 11719

(*) Notice: Subject to any disclaimer, the term of this patent is extended or adjusted under 35 U.S.C. 154(b) by 38 days.

(21) Appl. No.: 10/716,541

(22) Filed: Nov. 20, 2003

(51) Int. Cl.[7] .................................................. F16B 45/00
(52) U.S. Cl. ...................................... 248/315; 24/115 R
(58) Field of Search ................................ 248/315, 317, 248/223.31, 229.15, 229.14, 229.16, 229.26, 230.7; 24/115 R, 122.3, 127, 129 R, 129 D, 132 R

(56) References Cited

U.S. PATENT DOCUMENTS

| | | | | | |
|---|---|---|---|---|---|
| 1,833,690 | A | * | 11/1931 | Penners | 248/210 |
| 2,361,069 | A | * | 10/1944 | Steinhardt | 70/459 |
| 2,379,378 | A | * | 6/1945 | Rousseau | 248/551 |
| 3,131,900 | A | | 5/1964 | Anderson et al. | |
| 3,223,369 | A | | 12/1965 | Benninger, Jr. | |
| 3,239,181 | A | | 3/1966 | Ellerbrock | |
| 3,246,867 | A | | 4/1966 | Ewing | |
| 4,025,016 | A | | 5/1977 | Brothers | |
| 4,036,463 | A | | 7/1977 | Hopkins et al. | |
| 4,186,903 | A | | 2/1980 | Fazakerley | |
| 4,455,717 | A | * | 6/1984 | Gray | 24/115 R |
| 4,662,954 | A | | 5/1987 | Fedoris | |
| 4,884,824 | A | * | 12/1989 | Radke | 280/770 |
| 5,020,192 | A | * | 6/1991 | Gerlach | 24/136 R |
| 5,118,064 | A | * | 6/1992 | Gonsalves | 248/313 |
| 5,697,128 | A | * | 12/1997 | Peregrine | 24/115 G |
| 5,743,451 | A | | 4/1998 | Kahn | |
| 5,791,022 | A | * | 8/1998 | Bohman | 24/130 |
| 5,806,822 | A | * | 9/1998 | Schulz | 248/309.1 |
| 5,842,584 | A | * | 12/1998 | Baird | 211/69.1 |
| 6,062,449 | A | | 5/2000 | Kahn | |
| 6,254,045 | B1 | | 7/2001 | Oatsvall | |
| 6,338,459 | B1 | | 1/2002 | Biggs | |
| 6,443,342 | B1 | | 9/2002 | Kahn | |
| 2002/0101311 | A1 | * | 8/2002 | May | 335/205 |

* cited by examiner

*Primary Examiner*—Anita King
*Assistant Examiner*—Amy J. Sterling
(74) *Attorney, Agent, or Firm*—Peter A. Borsari

(57) ABSTRACT

A universal tool holder for carrying a tool or other article, for example, a cordless drill, nail gun, hammer or shovel is provided comprising a stretchable cord that is formed into a looped end and adapted to be wrapped about the handle of a tool in such a manner that it tightly engages the tool, and a second end having a retainable object, such as a ball, that is configured to be safely and securely held within a retaining receiver. The retaining receiver is in the form of a socket-type receiver configured to correspond to the geometrical shape of the retainable object such it can removably secure the retainable object. The socket-shaped retaining receiver can be incorporated into a variety of articles usefull in carrying and storing tools, including a belt clip, a wall mounting implement or a ladder mounting implement. By integrating the retaining receiver into such a variety of articles, any tool carried by the universal tool holder can be removably secured to the retaining receiver, thereby enabling a user to suspend the tool from a belt clip, ladder or wall.

28 Claims, 9 Drawing Sheets

UNIVERSAL TOOL HOLDER

FIELD OF INVENTION

The present invention relates to the field of devices for carrying a tool, such as a cordless drill, nail gun, hammer or any other tool having a handle. More particularly, the present invention relates to a universal tool holder adapted to be secured to most any tool and which also can be removably secured to a belt clip or a ladder. More specifically, the present invention relates to a universal tool holder comprising a stretchable cord that is formed into a looped end and adapted to be wrapped about the handle of a tool in such a manner that it tightly engages the tool, and a ball end that is adapted to be safely and securely held within a retaining receiver. The retaining receiver can be integrated into a belt clip or a mounting implement to engage a wall, ladder or other article, thereby enabling the tool holder to be suspended from a belt clip or ladder.

BACKGROUND OF THE INVENTION

Devices for carrying tools are well known in the prior art. Many such devices are in the form of tool belts of various configurations which are designed to carry and retain one or more desired tools while allowing the user to keep his hands free. Conventional tool belts are provided with leather or cloth loops which depend from the belt and which serve as tool retainers. Although useful to some extent, such tool belts present inherent deficiencies which limit their usefulness. For example because cloth is not necessarily a rigid structure, cloth loops may close when not in use, making it difficult for the user to replace the tool into the loop with one hand. More over, a loop may tightly constrict about the tool handle as the tool settles into position, thereby making it difficult to remove the tool when needed. Similar problems arise with the use of the more rigid leather loops.

Another type of device for carrying tools is a belt clip which is modified with a tool carrying end. Examples of such belt clips include U.S. Pat. No. 5,743,451 to Kahn, issued Apr. 28, 1998, U.S. Pat. No. 6,062,449 to Kahn, issued May 16, 2000 and U.S. Pat. No. 6,443,342 to Kahn, issued Sep. 3, 2002. These belt clips, all invented by the inventor of the instant application, are provided with a U-shaped hook which swivels about a tool's center of gravity. While these tool-toting devices have achieved commercial success, a disadvantage to these devices is that they cannot be removably secured to all types of tools. In addition, these tool-toting devices are not adapted easily for suspension from a wall, ladder or other object.

Article holders, particularly paint can holders, have been developed for attachment to the leg of a ladder. U.S. Pat. No. 3,131,900 to Anderson et al., issued May 5, 1964, U.S. Pat. No. 3,239,181 Ellerbrock, issued Mar. 8, 1966, U.S. Pat. No. 3,246,867 to Ewing, issued Apr. 19, 1966, U.S. Pat. No. 4,025,016 to Brothers, issued May 24, 1977, U.S. Pat. No. 4,036,463 to Hopkins et al., issued Jul. 19, 1977 and U.S. Pat. No. 6,338,459 to Biggs, issued Jan. 15, 2002, each discloses a clamping member adapted to secure an article, usually a paint can, to the stile of a ladder. However, none of the clamping members described in these patents are capable of securely engaging a tool and suspending the thus-engaged tool from a ladder.

Devices also have been developed to secure an article, particularly a paint can, to the hollow rung of a ladder, as exemplified by U.S. Pat. No. 3,223,369 to Benninger, Jr., issued Dec. 14, 1965, U.S. Pat. No. 4,186,903 to Fazakerley, issued Feb. 5, 1980, U.S. Pat. No. 4,662,594 to Dubis, issued May 5, 1987 and U.S. Pat. No. 6,254,045 to Oatsvall, issued Jul. 3, 2001.

Despite the advances of the prior art, a need still exists for a universal tool holder which can be removably attached about the handle of most any tool and which, through the utilization of a unique retaining receiver, can be removably secured to a belt clip, wall, ladder or other article. Such a universal too holder should be capable of being easily and firmly attached about the handle of most any tool. Moreover, such a universal tool holder should be capable of being easily and removably secured within a retaining receiver. In addition, the retaining receiver should be capable of being incorporated into a wide variety of mounting implements. Also, mounting implements having such a retaining receiver should be quickly and easily secured to both conventional hollow rung ladders and standard A-frame ladders. Further, such a universal tool holder and retaining receiver should be inexpensive to manufacture and easy to use.

SUMMARY OF THE INVENTION

Accordingly, it is an object of the present invention to provide a universal tool holder which can be removably attached to most any tool.

It is another object of the present invention to provide a universal tool holder which is adapted to be held within a retaining receiver.

It is also an object of the present invention to provide a universal tool holder which can be easily and quickly introduced into a retaining receiver.

It is an additional object of the present invention to provide a retaining receiver for a universal tool holder which can be incorporated into a belt clip.

It is yet another object of the present invention to provide a retaining receiver for a universal tool holder which can be incorporated into a wall mount.

It is a further object of the present invention to provide a retaining receiver for a universal tool holder which can be incorporated into an expandable mounting implement that can be removably secured to the hollow rung of a ladder.

It is still another object of the present invention to provide a retaining receiver for a universal tool holder which can be incorporated into a spring mounting implement that can be removably secured to the leg of a ladder.

It is also another object of the present invention to provide a universal tool holder and receiving retainer which is inexpensive to manufacture and easy to use.

Additional objects, advantages and novel features of the invention will be set forth in part of the description and claims which follow, and in part will become apparent to those skilled in the art upon examination of the following specification and claims or may be learned by practice of the invention.

BRIEF DESCRIPTION OF THE DRAWINGS

The present invention will be better understood with reference to the appended drawing sheets, wherein.

DETAILED DESCRIPTION

Figure 1A:
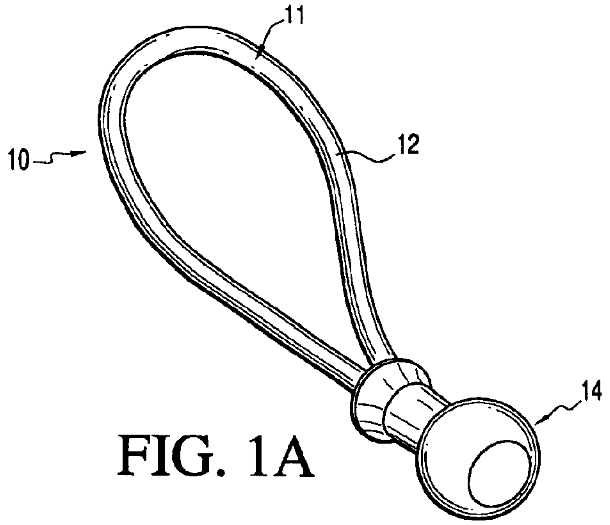
FIG. 1A is a side perspective view of the universal tool holder of the present invention.
Figure 1B:
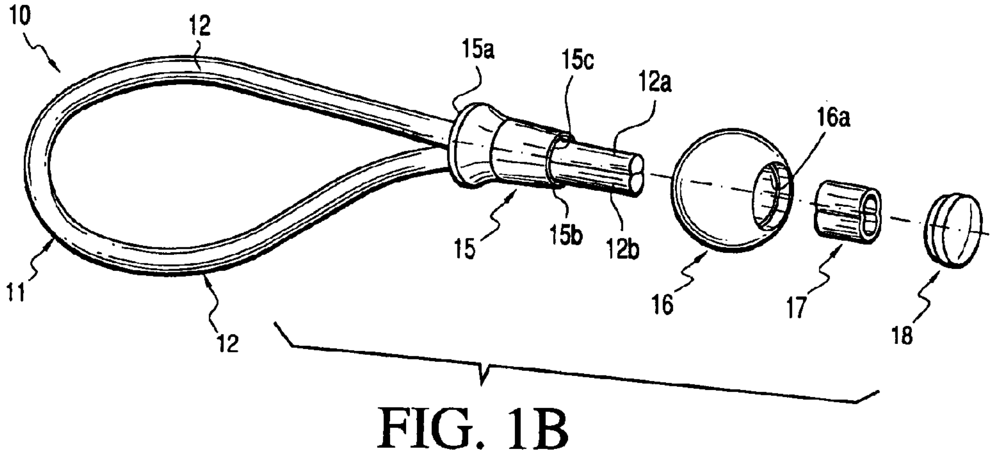
FIG. 1B is a side explosive view of the universal tool holder of the present invention.

The present invention relates to a universal tool holder which can be attached to most any type of tool and which can be removably secured, through the utilization of a unique retaining receiver, to a belt clip or a mounting implement for attachment to a wall, ladder or other article. Referring now to FIGS. 1A and 1B, the universal tool holder 10 comprises a looped end 11 formed from a stretchable cord 12, such as a bungee cord, having a first end 12*a* and a second end 12*b*, and a ball end 14. The universal tool holder further comprises a frusto-conical locking spacer 15 having a proximal end 15*a*, a distal end 15*b* and a central opening 15*c*, a spherical element 16, hereinafter referred to as a ball, having an aperture 16*a* extending therethrough, said aperture having a diameter corresponding to the outer diameter of said distal end 15*b* of said locking spacer 15, a crimped locking element 17 and a cap 18.

The looped end 11 is constructed by introducing both first end 12*a* and second end 12*b* of the stretchable cord 12 into the proximal end 15*a* of the locking spacer, through the central opening 15*c* and passing both said first and second ends through the distal end 15*b* of the locking spacer, such that said first and second ends are positioned outside said distal end 15*b*. The ball end 14 is constructed by introducing the ball 16 over the first and second ends of said stretchable cord 12 and onto said distal end 15*b* of the locking spacer 15 in such a manner that said ball 16 tightly engages said distal end 15*b*. Crimping element 17 then is passed over first and second ends 12*a* and 12*b* of the stretchable cord 12 in order to prevent said first and second ends from being pulled back through the locking spacer 15. The crimping element 17 is sized to be retained within aperture 16*a* of the ball 16. A cap member 18 is inserted into the aperture 16*a* and is retained therein by a snap-fit arrangement.

Figure 2:
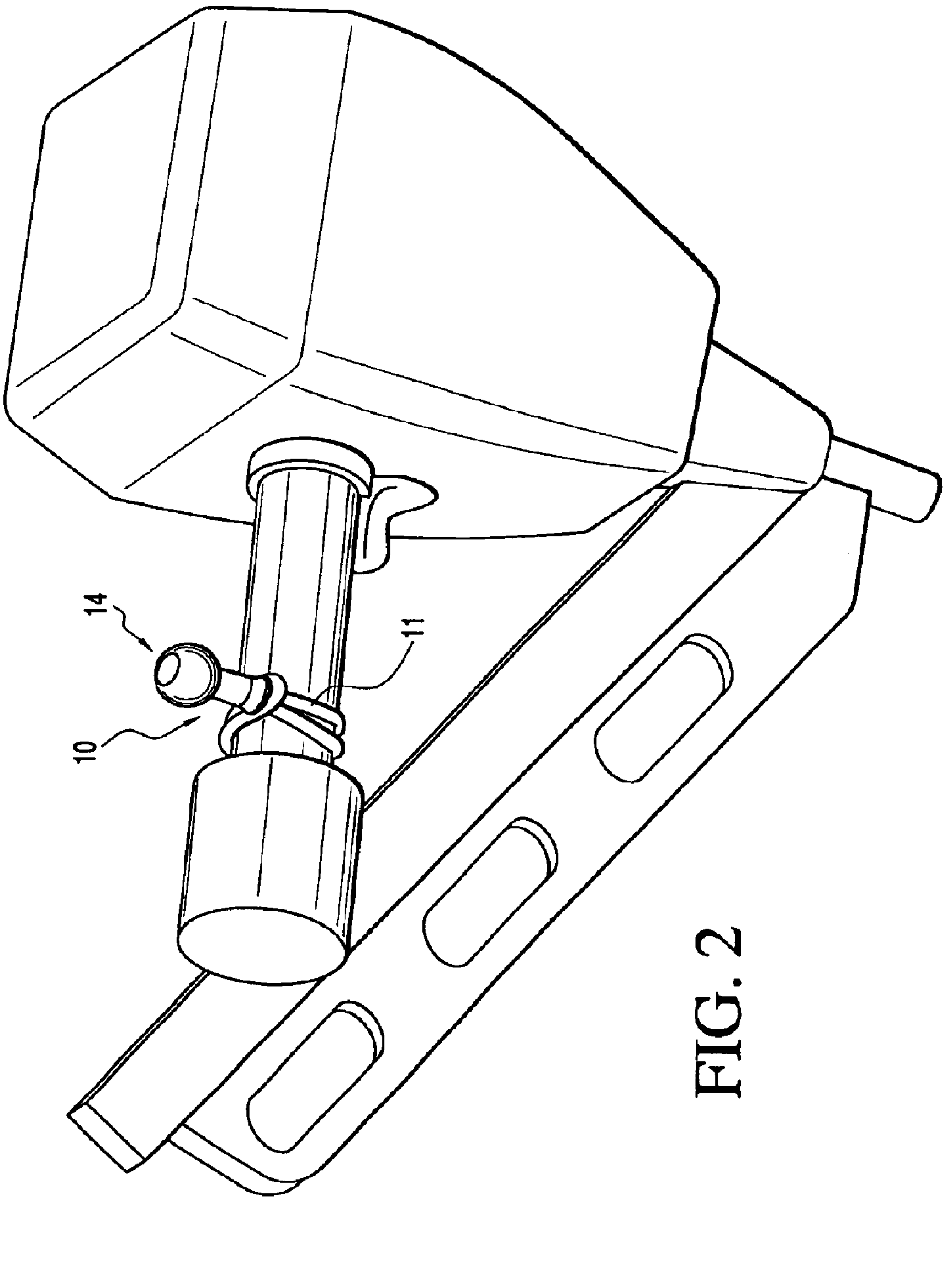
FIG. 2 is a side perspective view of the universal tool holder of the present invention secured to the handle of a nail gun.

The universal tool holder 10 is designed to be secured to most any tool, including for example, a power drill or a nail gun. Referring now to FIG. 2, the universal tool holder 10 is secured to a nail gun by first wrapping the looped end 11 about the handle of the nail gun and then passing the looped end over the ball end 14 such that the looped end is disposed under the proximal end of the locking spacer, thereby locking the looped end. The utilization of the stretchable cord (e.g. bungee cord), ensures that the looped end is tightly secured about the handle of the nail gun. In this manner, the nail gun now can be carried by grasping the ball end 14. The use of the stretchable cord also allows the nail gun to be suspended from and swivel from the ball end 14, thereby enabling the nail gun to maintain it's a proper center of gravity during movement by the user.

Figure 3B:
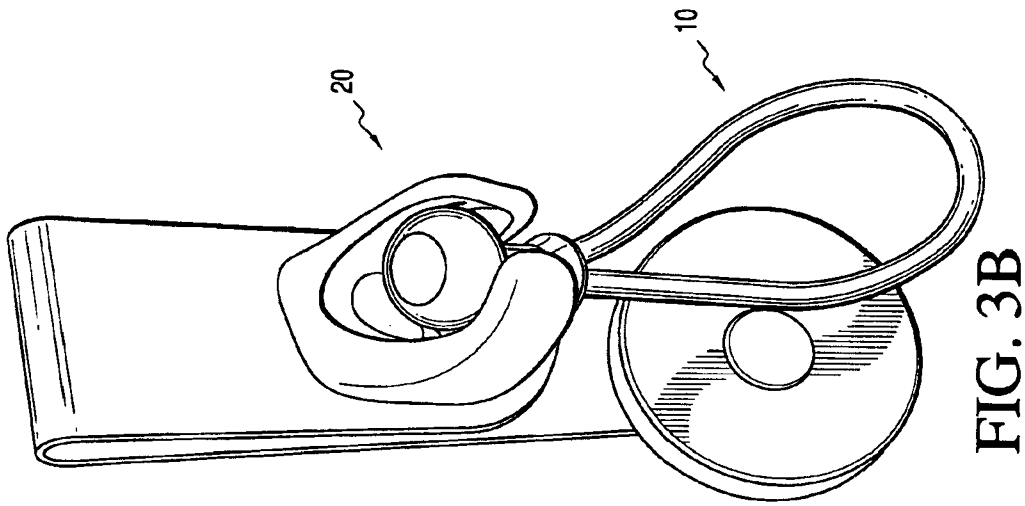
FIG. 3B is a side perspective view of the universal tool holder of the present invention removably secured to the belt clip of the present invention.
Figure 3A:
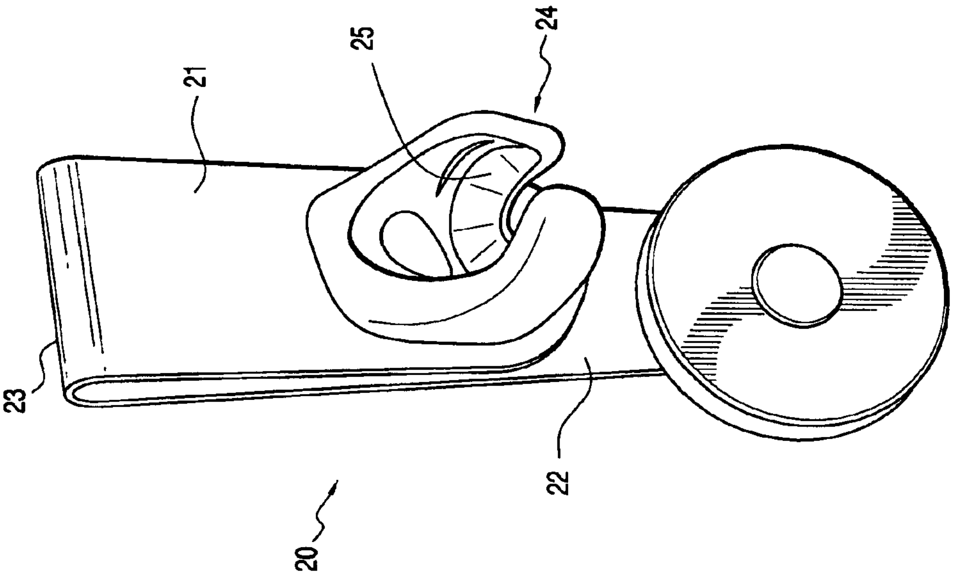
FIG. 3A is a side perspective view of a belt clip of the present invention.

Once the universal tool holder of the present invention has been secured to a tool, it can be used as a simple tool toting device simply by grasping the ball end 14 of the universal tool holder 10. The unique design of the ball end of the universal tool holder also enables it to be secured to a belt clip, wall mount or other mounting implement. Referring now to FIGS. 3A and 3B, the universal tool holder 10 is adapted to be removably secured to a belt clip 20. Belt clip 20 is in the form of a C-shaped clip having a front face 21, a rear face 22 and a rounded top end 23. The front face 21 terminates into a retaining receiver end 24, hereinafter referred to as a ball cup end. The ball cup end 24 can be constructed integrally with the clip 20 or can be secured to the clip by means well known in the art including for example, by rivet means or by a nut and bolt arrangement. The belt clip 20 can be composed of a variety of materials, including for example, hard and soft metals, such as aluminum and stainless steel, hard plastics, flexible plastics combinations thereof, such as a metal clip having a plastic sheath.

Figure 3C:
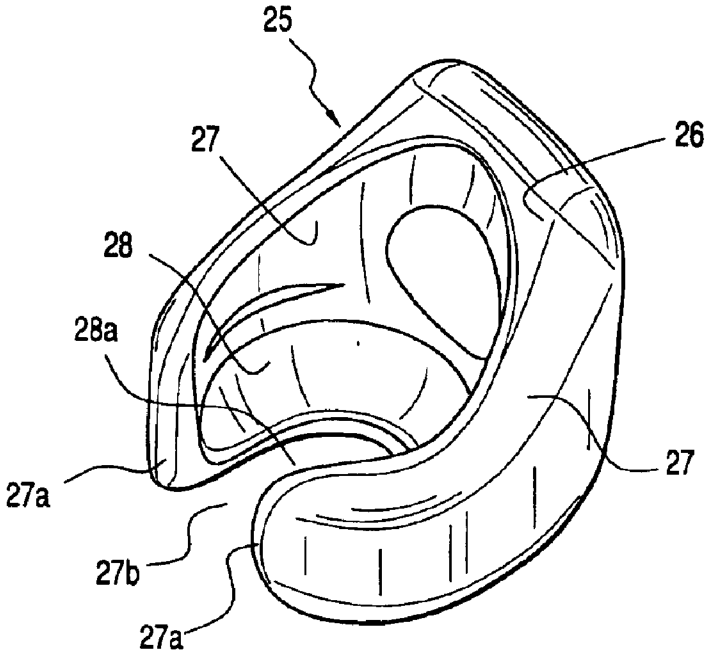
FIG. 3C is a top perspective view of the retaining receiver of the present invention.

The receiver or ball cup end 24 comprises a socket-shaped receiver, hereinafter referred to as a ball cup. As shown in FIG. 3C, the ball cup 25 includes a main section 26 with two arcuate arms 27 extending therefrom, the ends 27*a* of which curve inwardly and toward one another to create a passage 27*b*, and a concaved bottom section 28 having an opening 28*a*. The inner wall 29 of the main section 26 and arcuate arms 27 are concaved downwardly and inwardly to form the concaved bottom section 28 and opening 28*a*.

In operation, the locking spacer 15 of the universal tool holder 10 is introduced through the passage 27*b* between the ends 27*a* of the arcuate arms 27, the ball end 14 being disposed above the ball cup 25. The ball end 14 then is pivotally lowered into the concaved bottom section such that the ball 16 is snugly received and retained in the concaved bottom section 28, the locking spacer 15 and looped end 11 extending downwardly through the opening 28*a*. Because the diameter of the ball 16 is greater than that of the opening 28*a*, the ball end cannot exit through the opening 28*a*. In addition, as the width of passage 27*b* is less than the diameter of the ball 16, the ball cannot be displaced through the passage. Thus, the ball 16 remains safely and securely retained within the ball cup 25 until it is lifted upwardly out of the ball cup.

It is to be understood that although the ball 16 is described as being generally spherical in shape and that the ball cup 25 has a concaved bottom surface corresponding to the size and shape of the ball it is contemplated to be within the scope of the present invention that the ball 16 can be dimensioned in other geometrical forms including for example, pyrimadal or disk forms, provided that the bottom surface of the retaining receiver 25 corresponds to the geometrical form of the ball.

Figure 4:
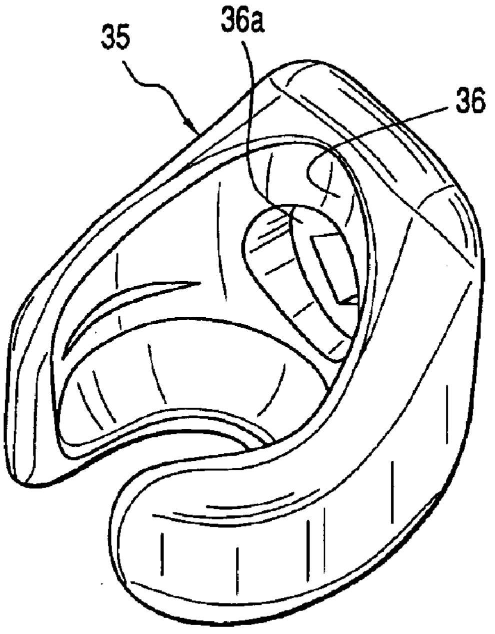
FIG. 4 shows the retaining receiver of the present invention adapted as a wall mount.

The universal tool holder of the present invention, in combination with the ball cup, can be adapted as a wall mount for storing a tool. Referring now to FIG. 4, a ball cup 35 is shown having a main section 36 which is provided with an aperture 36*a* extending therethrough. The ball cup 35 can be mounted to a wall simply by introducing a conventional screw through aperture 36*a* and into a wall. As discussed above with reference to the belt clip, once the ball 16 of the universal tool holder 10 is safely and securely retained within the ball cup 35, any tool removably secured to the universal tool holder can be stored in the wall mount. Although the ball cup 35 is shown being mounted to a wall by means of a conventional screw, it is contemplated that the ball cup can be mounted to a wall or other similar structure by a variety of means as will be obvious to those skilled in the art.

Figure 5A:
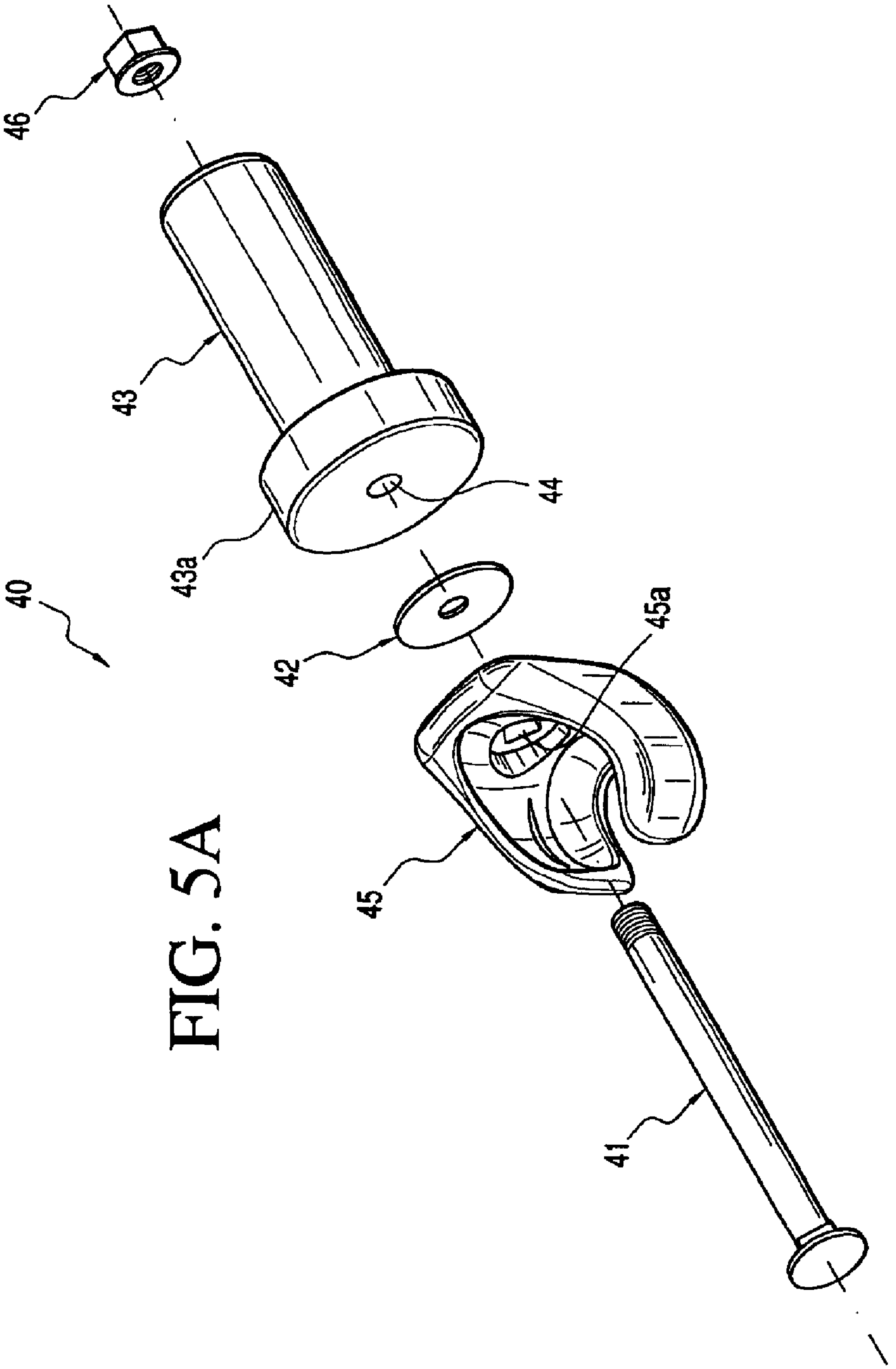
FIG. 5A is a side explosive view of the retaining receiver of the present invention incorporated into an expandable mounting implement.
Figure 5B:
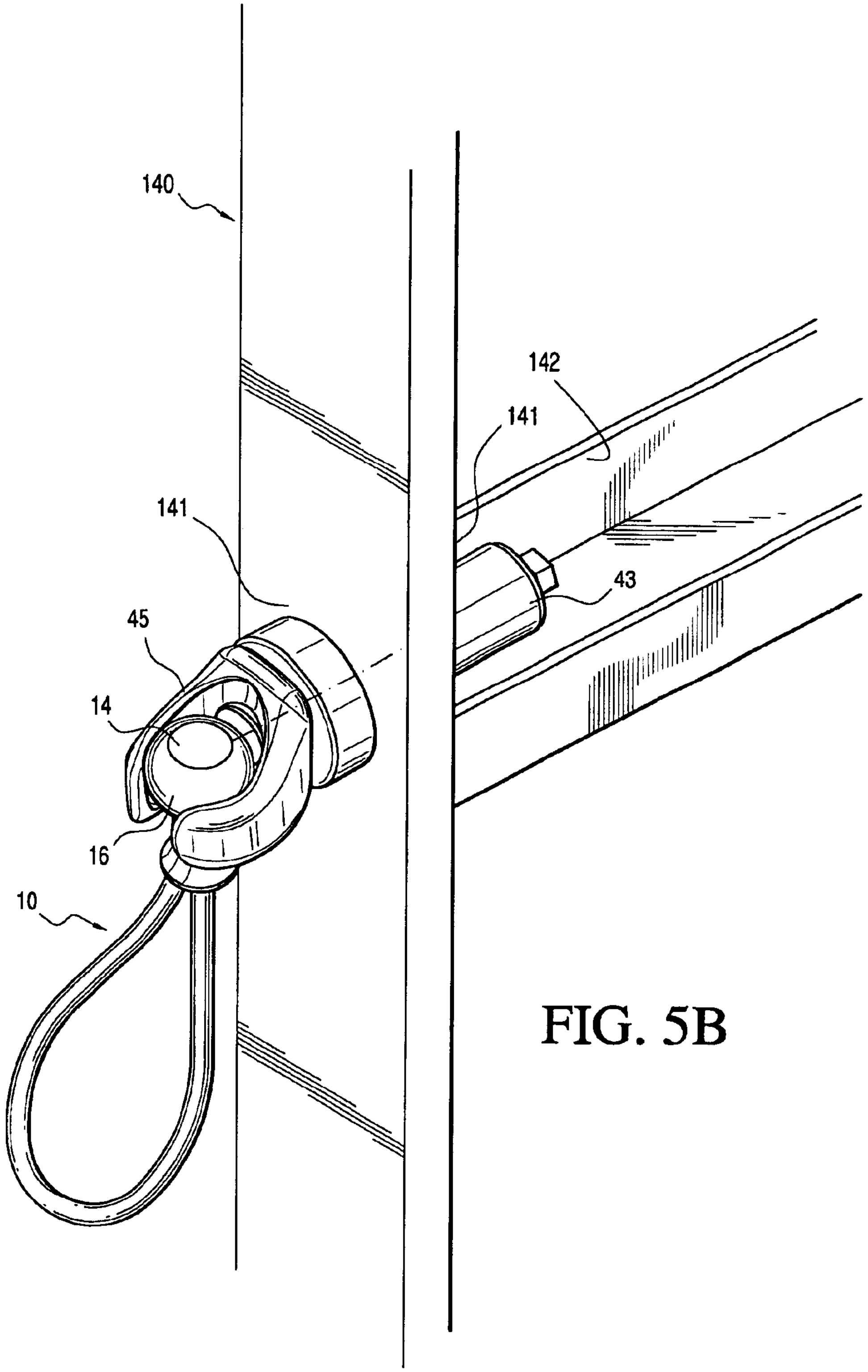
FIG. 5B shows the expandable mounting implement of the present invention removably secured to a conventional hollow rung ladder.

The universal tool holder of the present invention also can be secured to a conventional hollow rung ladder, such as an extension ladder, by incorporating the inventive ball cup into an expandable mounting implement configured to engage one of the hollow rungs disposed on the ladder. Referring now to FIGS. 5A and 5B, an expandable mount 40 is shown comprising a threaded rod 41, a washer or spacer 42, an expandable rubber element 43 having a flanged end 43*a*, both the expandable rubber element and flanged end having a central bore 44 extending therethrough, a ball cup 45 provided with an aperture 45*a*, and a nut 46 adapted to receive and retain threaded rod 41. The diameter of the central bore 44 and the aperture 45*a* are configured to be of sufficient size to receive threaded rod 41. The outer diameter of the expandable rubber element is configured to be of sufficient size to snugly engage the interior of the hollow rung. To form the expandable mounting implement 40, the threaded rod 41 is introduced through aperture 45*a* of the ball cup, through the opening of the washer 42, through the central bore 44 of the expandable rubber element 43 and into the nut 46 such that the washer rests against the flanged end 43*a*. The nut 46 is tightened to ensure that the threaded rod 41 cannot be pulled back through the central bore.

In operation, as shown in FIG. 5B, the expandable mounting implement 40 is removably secured to the hollow rung 141 of a ladder 140 by inserting rubber element 43 into the hollow rung of the ladder such that the rubber element snugly engages the interior surface 142 of the hollow rung 141, and then turning the ball cup 45 clockwise. The arrangement of the expandable rubber element 43 disposed between the washer 42 and nut 46 causes the rubber element to expand when the ball cup 45 is turned clockwise, thereby tightly securing the rubber element within the interior of the hollow rung 141. In this manner, a tool carried by the universal tool holder of the present invention can be suspended from the hollow rung ladder 140 by inserting the ball 16 of the universal tool holder 10 into the ball cup 45. In order to remove the expandable mount 40 from the hollow rung, the ball cup is turned counter-clockwise, thereby returning the rubber element 43 to its original size and shape, and retracting the rubber element 43 from the hollow rung 141.

Figure 6A:
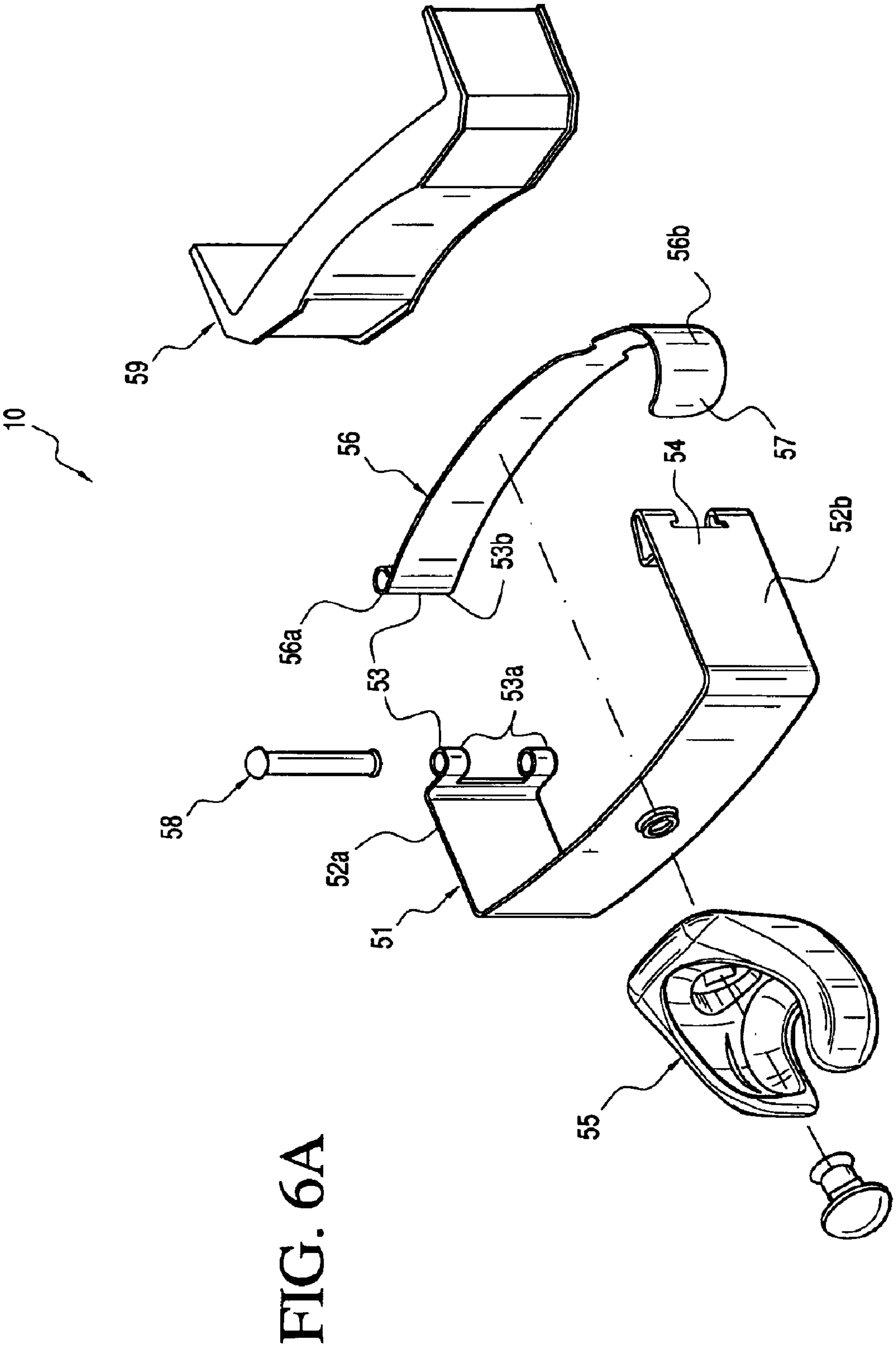
FIG. 6A is a side explosive view of the retaining receiver of the present invention incorporated into a spring mounting implement.
Figure 6B:
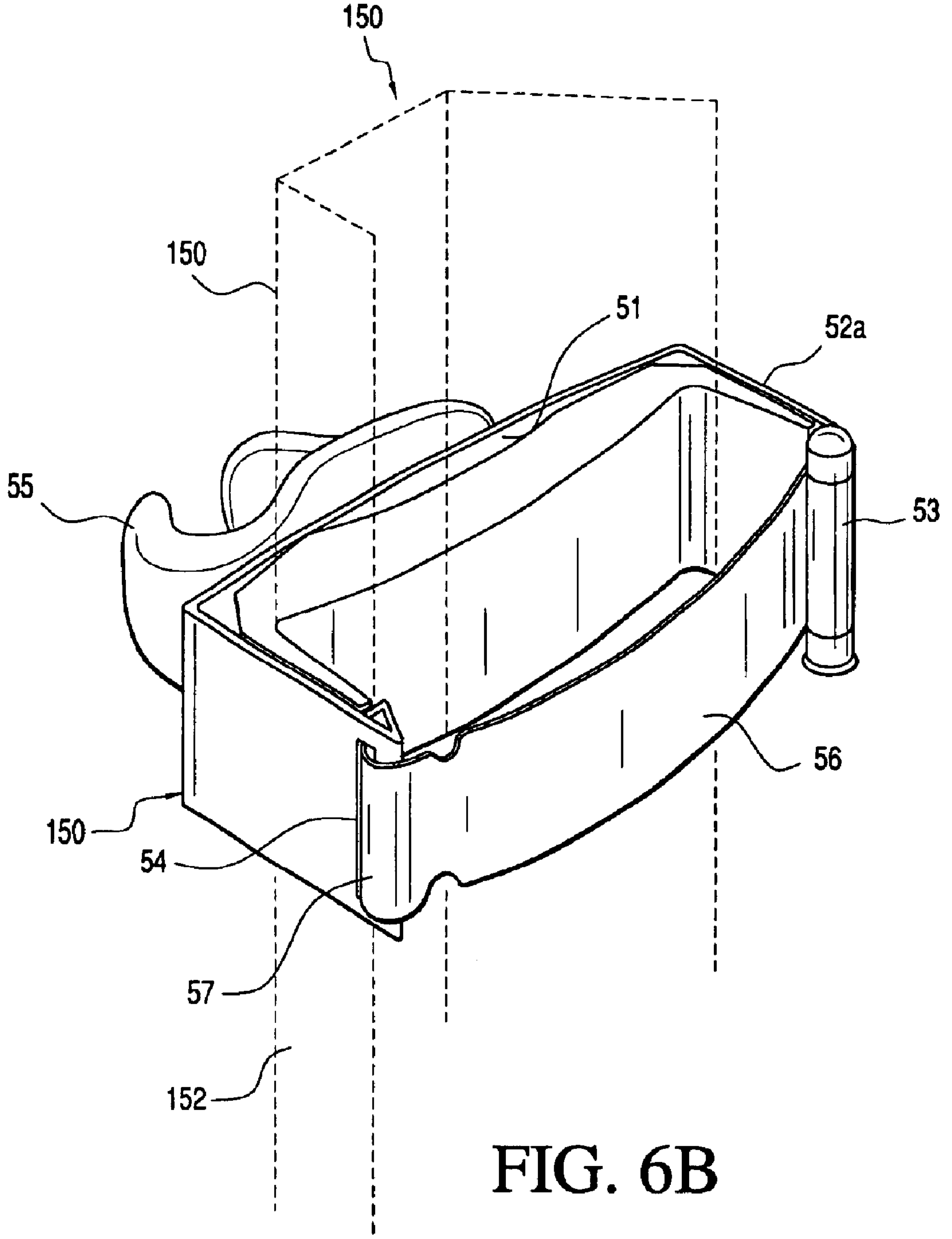
FIG. 6B shows the spring mounting implement of the present invention removably secured to a conventional A-frame ladder.

The universal tool holder of the present invention also can be secured to a conventional A-frame ladder by incorporating the inventive ball cup into a spring mounting implement configured to engage the stile or leg of a ladder. Referring now to FIGS. 6A and 6B, a spring mounting implement 50 is shown comprising a suspension frame member 51 having first and second frame arms 52*a* and 52*b* extending perpendicularly therefrom, a locking member 56 having first and second ends 56*a* and 56*b*, and a ball cup 55 which is permanently affixed to frame member 51. The first frame arm 52*a* terminates into the outer section 53*a* of a hinge element 53, and the second frame arm 52*b* terminates into a slotted locking mechanism 54. The first end 56*a* of the locking member 56 terminates into the inner section 53*b* of a hinge element 53, and the second end 56*b* of the locking member terminates into an arcuate tongue 57 configured to engage the slotted locking mechanism 54.

The ball cup 55 can be permanently affixed to the suspension frame member 51 by a rivet arrangement or can be affixed permanently to the suspension frame member by other means well know in the art, suitable examples of which include welding the ball cup to the frame member and a nut and bolt arrangement. The inner section 53*b* of the hinge element matingly corresponds to the outer section 53*a* and are joined together by a locking pin 58 to form the hinge element 53. In this manner, first end 56*a* of the locking member 56 is hingedly secured to the suspension frame member 51.

The length of the frame member 51 is configured to be slightly larger than the horizontal length of a conventional ladder leg and the length of the first and second frame arms 52 are configured to be slightly larger than the horizontal width of a conventional ladder leg, such the suspension frame member and arms snugly engage three sides of a ladder leg. Preferably, the suspension frame member and locking element are composed of a flexible steel material.

In operation, as shown in FIG. 6B, the spring mounting implement 50 is removably secured to a leg 151 of a standard A-frame ladder 150 by locating the suspension frame member 51 against the outer surface of a leg 151 such that the first and second frame arms extend over the leg and the ball cup 55 is disposed against the outer surface 152 of the ladder leg. The spring mount 50 then is removably secured to the ladder leg by introducing the arcuate tongue 57 into the slotted locking mechanism 54. Preferably, both the slotted locking mechanism 54 and arcuate tongue 57 are provided with corresponding notches in order to ensure that the tongue does not slip out of the locking mechanism.

A flexible insert 59 can be provided with the spring mount 50, the flexible insert be configured to be inserted within the area defined by the frame member and frame arms. The flexible insert can be used on ladders which have are designed with a width less than that of a standard frame ladder leg width.

Figure 7:
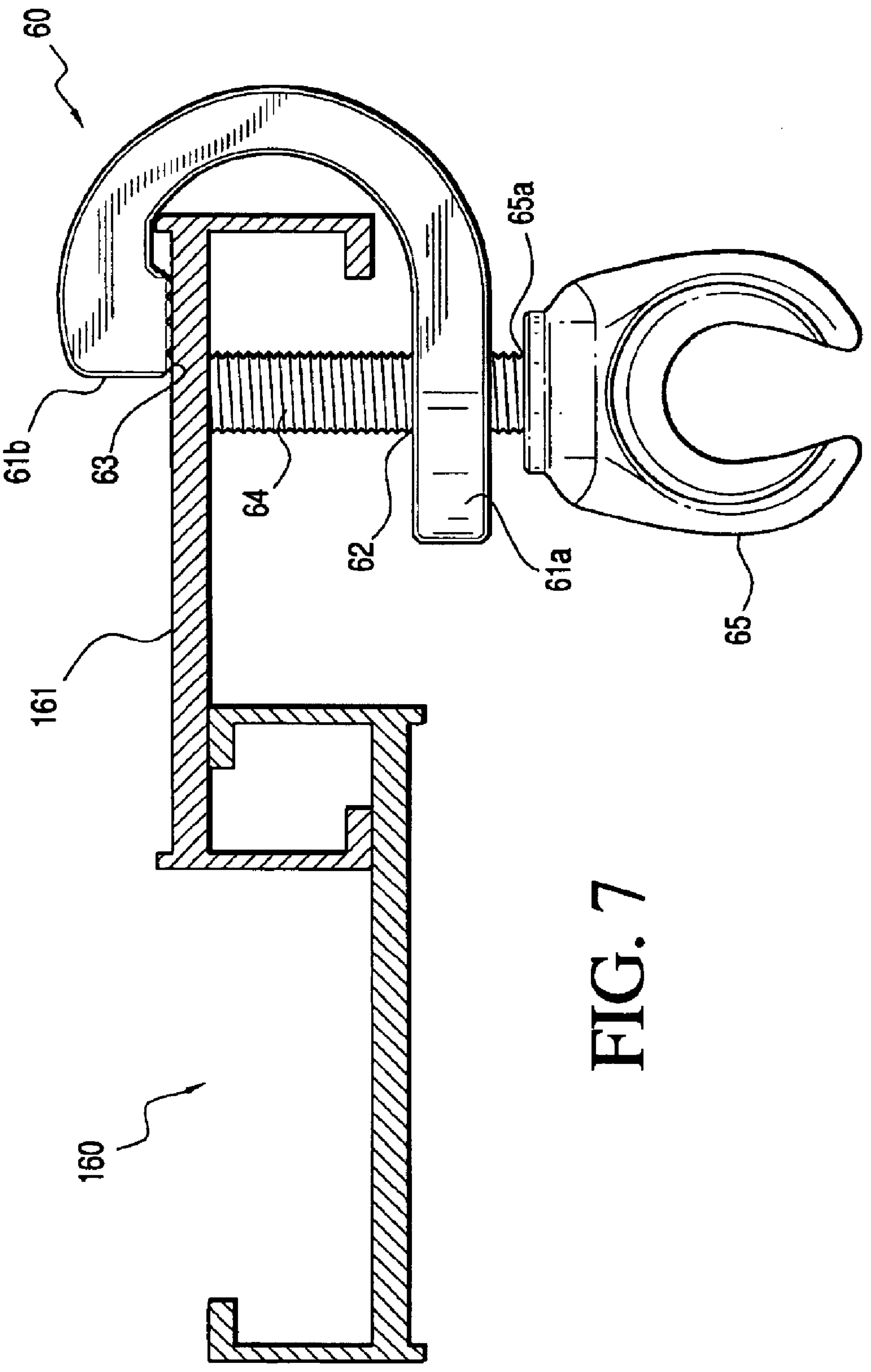
FIG. 7 is a side explosive view of the retaining receiver of the present invention incorporated into a C-clamp mounting implement and removably secured to a conventional ladder.

The universal tool holder of the present invention also can be secured to a conventional by incorporating the inventive ball cup into a C-clamp mounting implement configured to engage the stile or leg of a ladder. Referring now to FIG. 7, a C-clamp mounting implement 60 is shown having a first end 61*a* provided with a threaded opening 62 extending therethrough and a second end 61*b*, the second end having an interior grooved face 63, a threaded rod or bolt 64 and a ball cup 65 provided with a threaded opening 65*a* extending therethrough. Threaded opening 62 and threaded aperture 65*a* are configured to receive the threaded rod or bolt 64. To assemble the C-clamp mounting implement, the threaded rod 64 is introduced through the face 66 of the ball cup into the aperture 65*a* and through the threaded opening 62 of the first end 61*a* of the C-clamp such that the threaded rod extends toward second end 61*b*. In operation the C-clamp mounting implement 60 is removably secured to the leg 161 of a ladder 160 by positioning the ladder leg 161 between first and second ends 61*a* and 61*b* and then tightening the threaded rod against the ladder leg.

While particular embodiments of the invention have been described, it will be understood, of course, that the invention is not limited thereto, and that many obvious modifications and variations can be made, and that such modifications and variations are intended to fall within the scope of the appended claims.

What is claimed is:

1. A universal tool holder for removably attaching and carrying a tool, comprising:

a. a stretchable cord having first end and a second end;

b. a frusto-conical locking spacer having a proximal end, a distal end and a central opening, said distal end having a first outer diameter;

c. a retainable object having an aperture extending therethrough, said aperture having a diameter corresponding to said first outer diameter of said distal end;

d. a crimped locking element;

e. a looped end, said looped end formed by inserting said first and second ends of said stretchable cord into said proximal end of said locking spacer, through said central opening of said locking spacer and out said distal end of said locking spacer such that said first and second ends of said stretchable cord are positioned outside said distal end, and f. a terminal end, said terminal end formed by passing said retainable object over said first and second ends of said stretchable cord and onto said distal end of said locking spacer and introducing said crimped locking element over said first and second ends of said stretchable cord in such a manner that said first and second ends of said stretchable cord cannot be pulled back through said locking spacer and said retainable object is disposed at said terminal end, wherein said universal tool holder is removably attached to a tool by wrapping said looped end about a portion of a tool and over said retainable object at said terminal, and wherein a retaining receiver having a main section with an inner surface and an open bottom surface is provided, said retainable object having an outer surface conforming to said inner surface and bottom surface of said retaining receiver, such that said retainable object can be introduced and removably secured within said retaining receiver in such a manner that when said retainable object is secured within said retaining receiver, said locking spacer and said looped end being disposed below said open bottom surface and a tool attached to said universal tool holder can be suspended from said retaining receiver.

2. The universal tool holder in accordance with claim 1, wherein said retainable object is in the form of a ball and said terminal end is a ball end.

3. The universal tool holder in accordance with claim 2, wherein said retaining receiver is a ball cup comprising:

a. a main section having two arcuate arms extending therefrom, each of said two arcuate arms having an arm end which curves inwardly and toward said other arm end;

b. an inner wall concaved downwardly and inwardly from said main section and two arcuate arms to form a concaved bottom section having a bottom opening, and c. a passage formed by between said ends of said two arcuate arms.

4. The universal tool holder in accordance with claim 3, wherein said ball is introduced into said ball cup by introducing said locking spacer through said passage between said ends of said two arcuate arms, said ball end being disposed above said ball cup, pivotally lowering said ball end into said concaved bottom section until said ball contacts said concaved bottom section in such a manner that said locking spacer and said looped end extend downwardly through said bottom opening and wherein said ball has an outer diameter, said outer diameter being greater than said bottom opening such that said ball cannot exit through said bottom opening.

5. The universal tool holder in accordance with claim 1, wherein said main section of said retaining receiver is provided with amounting aperture such that said retaining receiver can be mounted to a wall by introducing a screw through said mounting aperture and into a wall.

6. The universal tool holder in accordance with claim 5, wherein a tool attached to said universal tool holder can be stored against a wall by introducing said retainable object into said retaining receiver.

7. The universal tool holder in accordance with claim 4, wherein said main section of said ball cup is provided with a mounting aperture such that said ball cup can be mounted to a wall by introducing a screw through said mounting aperture and into a wall.

8. The universal tool holder in accordance with claim 7, wherein a tool attached to said universal tool holder can be stored against a wall by introducing said ball into said ball cup.

9. The universal tool holder in accordance with 1, wherein said retaining receiver is incorporated into an expandable mounting implement, said expandable mounting implement being configured to be removably secured into the interior of a hollow rung of a ladder.

10. The universal tool holder in accordance with claim 9, wherein said expandable mounting implement comprises:

a. a threaded rod;

b. a washer;

c. an expandable rubber element having a flanged end and having central bore extending therethrough, said rubber element configured to be of sufficient size to be snugly inserted within the interior of a hollow rung of a ladder and said central bore having a bore diameter, said diameter being of sufficient size to receive said threaded rod;

d. said retaining receiver having a mounting aperture disposed within said main section, said mounting aperture having a mounting aperture diameter, said mounting aperture diameter being of sufficient size to receive said threaded rod, and e. a threaded nut configured to threadingly engage said thread rod, wherein said expandable mounting implement is formed by introducing said threaded rod through said mounting aperture, through said washer, through said central bore and into said threaded nut such that said washer contacts said flanged end.

11. The universal tool holder in accordance with claim 10, wherein said expandable mounting implement is removably secured into the interior of a hollow rung of a ladder by inserting said expandable rubber element into the interior of a hollow rung of a ladder, and turning said retaining receiver clockwise in such a manner that the arrangement of said rubber element disposed between said washer and said threaded nuit causes said rubber element to expand within the interior of a hollow rung.

12. The universal tool holder in accordance with 4, wherein said ball cup is incorporated into an expandable mounting implement, said expandable mounting implement being configured to be removably secured into the interior of a hollow rung of a ladder.

13. The universal tool holder in accordance with claim 12, wherein said expandable mounting implement comprises:

a. a threaded rod;

b. a washer;

c. an expandable rubber element having a flanged end and having central bore extending therethrough, said rubber element configured to be of sufficient size to be snugly inserted within the interior of a hollow rung of a ladder and said central bore having a bore diameter, said diameter being of sufficient size to receive said threaded rod;

d. said ball cup having a mounting aperture disposed within said main section, said mounting aperture having a mounting aperture diameter, said mounting aperture diameter being of sufficient size to receive said threaded rod, and e. a threaded nut configured to threadingly engage said thread rod, wherein said expandable mounting implement is formed by introducing said threaded rod through said mounting aperture, through said washer, through said central bore and into said threaded nut such that said washer contacts said flanged end.

14. The universal tool holder in accordance with claim 13, wherein said expandable mounting implement is removably secured into the interior of a hollow rung of a ladder by inserting said expandable rubber element into the interior of a hollow rung of a ladder, and turning said ball cup clockwise in such a manner that the arrangement of said rubber element disposed between said washer and said threaded nuit causes said rubber element to expand within the interior of a hollow rung.

15. The universal tool holder in accordance with 1, wherein said retaining receiver is incorporated into an spring mounting implement, said spring mounting implement being configured to be removably secured to the leg of a ladder.

16. The universal tool holder in accordance with claim 15, wherein said spring mounting implement comprises:

a. a suspension frame member having a first frame extending perpendicularly therefrom, said first frame arm terminating into an outer section of a hinge element, and a second frame arm extending perpendicularly from said frame member, said second frame arm terminating into a slotted locking mechanism;

b. a locking member having a first locking end terminating into an inner section of a hinge element matingly corresponding to said outer section of a hinge element, and a second locking end terminating into an arcuate tongue, and c. a retaining receiver permanently affixed to said suspension frame member;

d. a locking pin, said locking pin joining said inner and outer sections of a hinge element, thereby forming a hinge in such a manner that said first locking end of said locking member is hingedly secured to said suspension frame member, wherein, said spring mounting implement is removably secured to a ladder leg having an outer surface by disposing said suspension frame member against an outer surface of a ladder leg such that said retaining receiver is disposed against an outer surface of a ladder and said first and said frame arms extend over the leg, and locking said spring mounting implement thus disposed to a ladder leg by inserting said arcuate tongue of said locking member into said slotted locking mechanism.

17. The universal tool holder in accordance with claim 16, wherein said slotted locking mechanism and said arcuate tongue are provided with corresponding notches such that said arcuate tongue cannot slip out of said slotted locking mechanism.

18. The universal tool holder in accordance with claim 16, further comprising a flexible insert being configured to be inserted within an area defined by said suspension frame member and said first and second frame arms.

19. The universal tool holder in accordance with 4, wherein said ball cup is incorporated into an spring mounting implement, said spring mounting implement being configured to be removably secured to the leg of a ladder.

20. The universal tool holder in accordance with claim 19, wherein said spring mounting implement comprises:

a. a suspension frame member having a first frame extending perpendicularly therefrom, said first frame arm terminating into an outer section of a hinge element, and a second frame arm extending perpendicularly from said frame member, said second frame arm terminating into a slotted locking mechanism;

b. a locking member having a first locking end terminating into an inner section of a hinge element matingly corresponding to said outer section of a hinge element, and a second locking end terminating into an arcuate tongue, and c. said ball cup receiver permanently affixed to said suspension frame member;

d. a locking pin, said locking pin joining said inner and outer sections of a hinge element, thereby forming a hinge in such a manner that said first locking end of said locking member is hingedly secured to said suspension frame member, wherein, said spring mounting implement is removably secured to a ladder leg having an outer surface by disposing said suspension frame member against an outer surface of a ladder leg such that said ball cup is disposed against an outer surface of a ladder and said first and said frame arms extend over the leg, and locking said spring mounting implement to a ladder leg by inserting said arcuate tongue of said locking member into said slotted locking mechanism.

21. The universal tool holder in accordance with claim 20, wherein said slotted locking mechanism and said arcuate tongue are provided with corresponding notches such that said arcuate tongue cannot slip out of said slotted locking mechanism.

22. The universal tool holder in accordance with claim 20, further comprising a flexible insert being configured to be inserted within an area defined by said suspension frame member and said first and second frame arms.

23. The universal tool holder in accordance with 1, wherein said retaining receiver is incorporated into an C-clamp mounting implement, said C-clamp mounting implement being configured to be removably secured to the leg of a ladder.

24. The universal tool holder in accordance with claim 23, wherein said C-clamp mounting implement comprises:

a. a C-shaped clamp having a first clamp end provided with a threaded clamp opening extending therethrough and a second clamp end, said second clamp end having an interior grooved face;

b. a threaded rod, and c. a retainable object having a front face and a threaded opening extending therethrough, wherein, said C-clamp mounting implement is assembled introducing said threaded rod through said face of said retainable object, into said threaded opening and through said threaded clamp opening such that such that said threaded rod extends toward said second clamp end.

25. The universal tool holder in accordance with claim 24, wherein said C-clamp mounting implement is removably secured to the leg of a ladder by positioning a ladder leg between said first and second clamp ends such that said interior grooved face of said second clamp contacts said ladder leg, and then rotating said threaded rod until said threaded rod tightly engages said ladder leg.

26. The universal tool holder in accordance with 4, wherein said ball cup is incorporated into an C-clamp mounting implement, said C-clamp mounting implement being configured to be removably secured to the leg of a ladder.

27. The universal tool holder in accordance with claim 26, wherein said C-clamp mounting implement comprises:

a. a C-shaped clamp having a first clamp end provided with a threaded clamp opening extending therethrough and a second clamp end, said second clamp end having an interior grooved face;

b. a threaded rod, and c. said ball cup having a front face and a threaded opening extending therethrough, wherein, said C-clamp mounting implement is assembled introducing said threaded rod through said face of said ball cup, into said threaded opening and through said threaded clamp opening such that such that said threaded rod extends toward said second clamp end.

28. The universal tool holder in accordance with claim 27, wherein said C-clamp mounting implement is removably secured to the leg of a ladder by positioning a ladder leg between said first and second clamp ends such that said interior grooved face of said second clamp contacts said ladder leg, and then rotating said threaded rod until said threaded rod tightly engages said ladder leg.

* * * * *